United States Patent
Jang et al.

(10) Patent No.: US 11,260,766 B2
(45) Date of Patent: Mar. 1, 2022

(54) SYSTEM AND METHOD FOR CONTROLLING LOW VOLTAGE DC-DC CONVERTER FOR VEHICLE

(71) Applicants: Hyundai Motor Company, Seoul (KR); Kia Motors Corporation, Seoul (KR)

(72) Inventors: Young Jin Jang, Seoul (KR); Hye Seung Kim, Gyeonggi-do (KR); Joon Young Jeon, Seoul (KR); Han Shin Youn, Seoul (KR); Ho Joong Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 164 days.

(21) Appl. No.: 16/693,249

(22) Filed: Nov. 23, 2019

(65) Prior Publication Data
US 2020/0338996 A1 Oct. 29, 2020

(30) Foreign Application Priority Data
Apr. 26, 2019 (KR) .......... 10-2019-0049331

(51) Int. Cl.
*B60L 53/22* (2019.01)
*B60L 50/64* (2019.01)
(Continued)

(52) U.S. Cl.
CPC .............. *B60L 53/22* (2019.02); *B60L 50/64* (2019.02); *B60L 58/12* (2019.02); *H02J 9/061* (2013.01); *B60L 2210/10* (2013.01)

(58) Field of Classification Search
CPC .......... B60L 53/22; B60L 58/12; B60L 50/64; B60L 2210/10; B60L 53/24; B60L 58/18; B60L 53/53; B60L 2240/527; B60L 2250/10; B60L 53/00; B60L 2210/12; B60L 1/00; H02J 9/061; H02J 7/342;
(Continued)

(56) References Cited

U.S. PATENT DOCUMENTS

2016/0325636 A1* 11/2016 Masuda ................. B60L 58/20
2018/0099578 A1*  4/2018 Lee ......................... H02J 7/342

FOREIGN PATENT DOCUMENTS

| KR | 10-1655665 B1 | 9/2016 |
| KR | 10-1693956 B1 | 1/2017 |
| KR | 10-2018-0133984 A | 12/2018 |

* cited by examiner

*Primary Examiner* — Toan T Vu
(74) *Attorney, Agent, or Firm* — Mintz Levin Cohn Ferris Glovsky and Popeo, P.C.; Peter F. Corless (57) ABSTRACT

A system for controlling a low voltage DC-DC converter for a vehicle is provided. The system includes a low voltage DC-DC converter that converts a voltage of a main battery into a low voltage and outputs the same. An electric device is connected to an output terminal of the low voltage DC-DC converter and a first relay is connected to the output terminal of the low voltage DC-DC converter at a first terminal thereof. An auxiliary battery is connected to a second terminal of the first relay and a controller turns off the first relay and operates the low voltage DC-DC converter to output a minimum voltage capable of operating the electric device when the auxiliary battery is charged to a preset reference value or more while the main battery is being charged.

10 Claims, 4 Drawing Sheets

(51) Int. Cl.
*B60L 58/12* (2019.01)
*H02J 9/06* (2006.01)

(58) Field of Classification Search
CPC ..... H02J 2310/48; H02J 7/0047; Y02T 90/14; Y02T 90/12; Y02T 10/92; Y02T 10/7072; Y02T 10/70; Y02T 10/62; Y02T 10/72; H02M 3/00; H02M 2001/0032; H02M 1/0032; B60R 16/033; B60Y 2200/91; B60Y 2200/92
USPC .................................................. 307/9.1, 10.1
See application file for complete search history.

SYSTEM AND METHOD FOR CONTROLLING LOW VOLTAGE DC-DC CONVERTER FOR VEHICLE

CROSS REFERENCE TO RELATED APPLICATION

The present application claims priority to Korean Patent Application No. 10-2019-0049331, filed Apr. 26, 2019, the entire contents of which is incorporated herein for all purposes by this reference.

BACKGROUND

Field of the Invention

The present invention relates to a system and method of controlling a low voltage DC-DC converter for a vehicle, and more particularly, to a system and method of controlling a low voltage DC-DC converter for a vehicle to reduce power consumption in electric devices of the vehicle, and responding to a failure occurrence in the low voltage converter by adjusting an output voltage of the low voltage converter based on a state of an auxiliary battery while a main battery of the vehicle is being charged.

Description of the Related Art

Electric vehicles or plug-in hybrid vehicles are supplied with electric power, generally referred to as IG3 power, for supplying the same to electric devices that are required when charging a main battery that stores electric energy becoming a driving power source of the vehicle. The electric power is mainly supplied from electric power stored in a main auxiliary battery. Meanwhile, a low voltage DC-DC converter (LDC) configured to convert a voltage of the main battery into a low voltage and output the same is disposed between the main battery and the auxiliary battery, and the output voltage of the low voltage DC-DC converter is input to the auxiliary battery and the electric devices.

Conventionally, when charging the main battery, when the auxiliary battery is fully charged by the output voltage of the low voltage DC-DC converter, the low voltage DC-DC converter is operated to output a voltage identical to a voltage of the auxiliary battery. The output of the low voltage DC-DC converter is adjusted to prevent the auxiliary battery that is fully charged from being charged and discharged. However, the conventional method of controlling the low voltage DC-DC converter, when charging the main battery as above, increases power consumption in electric devices of a vehicle as electric power of a high voltage is supplied to the electric devices connected to the output terminal of the low voltage DC-DC converter.

For example, the electric devices of a vehicle may operate in voltage of 12V, but the conventional low voltage DC-DC converter maintains an output of 13V that is a voltage of the auxiliary battery. Accordingly, unnecessary electric power of a high voltage is supplied to the electric devices of a vehicle, thus causing increase in power consumption in electric devices.

The description provided above as a related art of the present disclosure is merely for helping understanding the background of the present disclosure and should not be construed as being included in the related art known by those skilled in the art.

SUMMARY

Accordingly, the present invention provides a system and method of controlling a low voltage DC-DC converter for a vehicle to reduce power consumption in electric devices of the vehicle by adjusting an output voltage of a low voltage DC-DC converter in a low level based on a state of an auxiliary battery when charging a main battery. The present invention further provides a system and method of controlling a low voltage DC-DC converter for a vehicle that responds to failure occurrence in the low voltage converter while adjusting an output voltage of the low voltage DC-DC converter in a low level.

According to one aspect of the present invention, a system for controlling a low voltage DC-DC converter for a vehicle may include a low voltage DC-DC converter configured to convert a voltage of a main battery into a low voltage and output the voltage; an electric device connected to an output terminal of the low voltage DC-DC converter; a first relay connected to the output terminal of the low voltage DC-DC converter at a first terminal thereof; an auxiliary battery connected to a second terminal of the first relay; and a controller configured to turn off the first relay and operate the low voltage DC-DC converter to output a minimum voltage capable of operating the electric device when the auxiliary battery is charged to a preset reference value or more while the main battery is being charged.

In an exemplary embodiment of the present invention, when the main battery starts charging by receiving charging electric power from external charging equipment, the controller may be configured to supply a charging voltage for providing electric power to a controller operating while the main battery is being charged from the first terminal of the first relay. In addition, the system may further include: a second relay connected to the first terminal of the first relay at a first terminal thereof, and connected to a charging electric power line for providing the charging voltage at a second terminal thereof. The controller may be configured to turn on the second relay to supply the charging voltage when the main battery starts charging.

The low voltage DC-DC converter may include: a power circuit chip configured to supply electric power to the low voltage DC-DC converter; and a microprocessor configured to execute operations of the low voltage DC-DC converter by being supplied with a voltage from the power circuit chip. The power circuit chip may be supplied with a constant voltage from the auxiliary battery by being connected to the second terminal of the first relay, and may be configured to provide or block the voltage to or from the microprocessor by receiving a trigger signal.

In an exemplary embodiment of the present invention, the microprocessor may be configured to output an operation maintain signal when receiving the voltage, and the low voltage DC-DC converter may further include an OR logic gate configured to receive the charging voltage and the operation maintain signal as an input, and provide the trigger signal to the power circuit chip as an output. In addition, the microprocessor may be configured to store a failure diagnosis code and transfer to the controller a failure alerting signal when failure occurs in the low voltage DC-DC converter where the output voltage of the low voltage DC-DC converter is not generated normally. The controller may be configured to turn on the first relay after being provided with the failure alerting signal.

In order to achieve the above object, according to another aspect of the present invention, a method of controlling a low voltage DC-DC converter for a vehicle, wherein the method is performed by using: a low voltage DC-DC converter configured to converted a voltage of a main battery into a low voltage and output the voltage; an electric device connected to an output terminal of the low voltage DC-DC converter; a first relay connected to the output terminal of the low voltage DC-DC converter at a first terminal thereof; and an auxiliary battery connected to a second terminal of the first relay, the method including: monitoring a state of charge (SOC) of the auxiliary battery when the main battery starts charging by being supplied with charging electric power from external charging equipment; and when the auxiliary battery is charged to a preset reference value or more, turning off the first relay, and operating the low voltage DC-DC converter to output a minimum voltage capable of operating the electric device.

In an exemplary embodiment of the present invention, the method may further include: prior to monitoring of the SOC of the auxiliary battery, when the main battery starts charging, providing a charging voltage for supplying electric power to a controller operating when the main battery is being charged from the first terminal of the first relay. In addition, in the providing of the charging voltage, the charging voltage may be supplied by turning on a second relay that is connected to the first terminal of the first relay at a first terminal thereof, and connected to a charging electric power line for supplying the charging voltage at a second terminal thereof.

In addition, the method may further include: after operating the low voltage DC-DC converter, when failure occurs in the low voltage DC-DC converter where the output voltage of the low voltage DC-DC converter is not generated normally, storing a failure diagnosis code, and generating a failure alerting signal. The method may further include: after the generating of the failure alerting signal, turning on the first relay.

In an exemplary embodiment of the present invention, the low voltage DC-DC converter may include: a power circuit chip configured to supply electric power to the low voltage DC-DC converter. Additionally, whether to supply the electric power may be determined by a trigger signal. The converter may further include a microprocessor configured to execute operations of the low voltage DC-DC converter by being supplied with a voltage from the power circuit chip, and configured to output an operation maintain signal when receiving the voltage; and an OR logic gate configured to receive the charging voltage and the operation maintain signal as an input, and output the trigger signal as an output. Prior to monitoring the SOC of the auxiliary battery, the method may further include: generating, by the OR logic gate, a trigger signal of an on state by receiving the voltage in a first input terminal of the OR logic gate, and thus providing, by the power circuit chip, the voltage; and outputting, by the microprocessor, the operation maintain signal by receiving the voltage from the power circuit chip, and providing the same to a second input terminal of the OR logic gate.

According to a system and method of controlling a low voltage DC-DC converter for a vehicle according to the present invention, a relay disposed between an auxiliary battery and a low voltage DC-DC converter may be turned off when the auxiliary battery is fully charged, and an output voltage of the low voltage DC-DC converter may be adjusted to be a voltage less than that of the auxiliary battery or less than a minimum voltage capable of operating electric devices. Thus, reduction in power consumption may be achieved by proving electric power of a reduced voltage to the electric device.

In addition, according to a system and method of controlling a low voltage DC-DC converter for a vehicle, when failure occurs where the low voltage DC-DC converter does not normally provide the output while the auxiliary battery and the output terminal of the low voltage DC-DC converter are not electrically connected to each other (e.g., the relay being turned off), electric power may be continuously supplied to the microprocessor within the low voltage DC-DC converter while the charging voltage supplied from the output terminal of the low voltage DC-DC converter is not supplied due to the failure. Thus, a failure diagnosis code may be stored, warning of the failure may be available, and the charging voltage may be supplied by turning on the relay again.

Effects obtainable from the present invention are not limited by the above mentioned effect, and other unmentioned effects may be clearly understood from the following description by those having ordinary skill in the technical field to which the present invention pertains.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", an and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a system and method of controlling a low voltage DC-DC converter for a vehicle according to various exemplary embodiments of the present invention will be described in detail with reference to the accompanying drawings.

Figure 1:
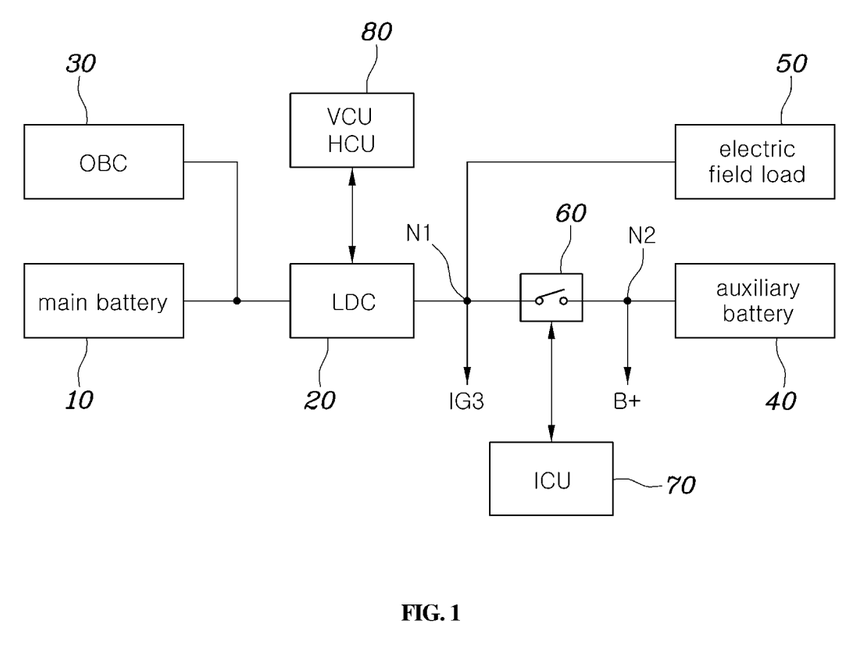
FIG. 1 is a block configuration diagram of a system for controlling a low voltage DC-DC converter for a vehicle according to an exemplary embodiment of the present invention.

FIG. 1 is a block configuration diagram of a system for controlling a low voltage DC-DC converter for a vehicle according to an exemplary embodiment of the present invention. Referring to FIG. 1, a system for controlling a low voltage DC-DC converter for a vehicle according to an exemplary embodiment of the present invention may include: a main battery 10, a low voltage direct current-direct current (DC-DC) converter 20 configured to convert a voltage of the main battery 10 into a low voltage and output the voltage, an electric device 50 connected to an output terminal of the low voltage DC-DC converter 20, a first relay 60 connected to the output terminal of the low voltage DC-DC converter 20 at a first terminal thereof, an auxiliary battery 40 connected to a second terminal of the first relay 60, and controllers 70 and 80 configured to turn off the first relay 60 when the auxiliary battery 40 is charged to a preset reference value, and configured to operate the low voltage DC-DC converter 20 to output a minimum voltage capable of operating the electric device 50 when the main battery 10 is being charged.

The main battery 10 is an energy supplying apparatus configured to supply electric power to a driving motor (not shown) configured to generate driving power for an electric vehicle or plug-in hybrid vehicle, and may be charged using electric power supplied from the outside (e.g., an external charging device). Electric vehicles or plug-in hybrid vehicles may include an on board charger (OBC) 30 configured to convert alternating current (AC) power supplied from external equipment into direct current (DC) power and provide the same to the main battery 10 to be charged.

The low voltage DC-DC converter (LDC) 20 may be configured to convert a high voltage of the main battery 10 to a low voltage that may be applied to the auxiliary battery 40 or electric device 50. The low voltage DC-DC converter 20 may include a circuit unit employed by applying various DC converter topologies which are known in the art, and a power circuit chip providing electric power to a microprocessor configured to operate switching elements included in the circuit unit and to other parts within the low voltage DC-DC converter 20 such as microprocessor.

The microprocessor included in the low voltage DC-DC converter 20 may be operated by a command provided from the external controllers 70 and 80. For example, the microprocessor may be configured to receive a control command regarding whether to operate and may be configured to receive an output voltage command from a vehicle controller (VCU) or hybrid controller (HCU) 80 of the external controllers. In association thereto, the microprocessor may be configured to perform a pulse width modulation or frequency modulation control for the switching element within the circuit unit using a preset control algorithm to adjust the low voltage DC-DC converter 20 to output a voltage of a desired size.

Various topologies for employing the circuit unit of the low voltage DC-DC converter 20 and output voltage/current control methods in association thereto are well known in the art and will not be described in further detail. In addition, the microprocessor and the power circuit chip within the low voltage DC-DC converter 20 which are applied to various exemplary embodiments of the present invention will be described in detail later.

The auxiliary battery 40 may be configured to supply electric power to various electric devices 50 applied to the vehicle, and may be connected to the output terminal of the DC converter 20 with the electric device 50. The auxiliary battery 40 may be charged by current output from the DC converter 20, and may be discharged by providing electric power used in the electric device 50.

Particularly, in an exemplary embodiment of the present invention, the auxiliary battery 40 may be connected to the output terminal of the low voltage DC-DC converter 20 via the first relay 60. In other words, an electric connection between the output terminal of the low voltage DC-DC converter 20 and the auxiliary battery 40 may be determined by the first relay 60 that is turned on/off by the controller 70. In addition, the electric device 50 may be connected to the output terminal of the low voltage DC-DC converter 20 rather than being connected to a terminal of the auxiliary battery 40 and the first relay 60. In other words, when the first relay 60 is in an on state, the electric device 50 may be supplied with electric power from the low voltage DC-DC converter 20 and the auxiliary battery 40 by being commonly connected thereto, and when the first relay 60 is in an off state, the electric device 50 may be supplied with electric power output from the low voltage DC-DC converter 20.

Meanwhile, a node N1 to which the low voltage DC-DC converter 20 and the first relay 60 are connected may be connected to a charging electric power line (generally, referred to as IG3 power) for providing electric power to various controllers and parts which operate when the main battery 10 is being charged through external equipment. In addition, a node N2 to which the low voltage DC-DC converter 20 and the auxiliary battery 40 are connected may be connected to a constant electric power line (generally, referred to as B+ power) that supplies constant electric power regardless of an operation state of the vehicle.

The controllers 70 and 80 may be configured to operate the above-described low voltage DC-DC converter 20 and turn the first relay 60 on and off. The controllers may be understood as a concept collectively referring to all controllers involved in executing operations of the low voltage DC-DC converter 20 such as vehicle control unit (VCU) or hybrid control unit (HCU) 80 or integrated control unit (ICU) 70 mounted within the vehicle, and a state of the first relay 60. Various exemplary embodiments of the present invention may adjust an output voltage of the low voltage DC-DC converter 20 based on a state of the auxiliary battery 40 while the main battery is being charged by electric power supplied from external charging equipment.

In response to determining that the OBC 30 operates so that charging of the auxiliary battery 40 is required while the main battery is being charged by being supplied with charging electric power from the external charging equipment, the controllers 70 and 80 may be configured to maintain the first relay 60 in an on state, and operate the low voltage DC-DC converter 20 to output a voltage (e.g., a voltage greater than a voltage output from the terminal of the auxiliary battery 40) capable of charging the auxiliary battery 40. The controllers 70 and 80 may be configured to monitor a state of charge (SOC) of the auxiliary battery 40, and when the auxiliary battery 40 is charged to a preset reference value or greater (or fully charged), the controllers may be configured to turn the first relay 60 off to disconnect the auxiliary battery 40 and the low voltage DC-DC converter 20 from each other.

As described above, when charging of the auxiliary battery 40 is completed and the electric connection with the low voltage DC-DC converter 20 is blocked, the low voltage DC-DC converter 20 may be configured to operate to maintain an output voltage of a size capable of providing to the electric device 50 as electric power. In other words, when connection between the auxiliary battery 40 and the low voltage DC-DC converter 20 is maintained, the low voltage DC-DC converter 20 has to maintain an output voltage the same as the voltage of the auxiliary battery 40 to prevent the auxiliary battery 40 from being discharged.

In another example, when the low voltage DC-DC converter 20 maintains the output voltage that is less than the auxiliary battery 40 while connection between auxiliary battery 40 and the low voltage DC-DC converter 20 is maintained, the electric device 50 may be configured to operate using electric power stored in the auxiliary battery 40. In the above two examples, the electric device 50 may be configured to operate by being supplied with a voltage of a size that corresponds to the voltage of the auxiliary battery 40 while the auxiliary battery 40 is in a fully charged state. Generally, the voltage of the auxiliary battery 40 is greater than the voltage of the electric device 50, and thus power consumption increases as a greater voltage is supplied to the electric device 50.

Various exemplary embodiments of the present invention isolate the auxiliary battery 40 through the first relay 60 after the auxiliary battery 40 becomes fully charged, and supply electric power to the electric device 50 using the output voltage of the low voltage DC-DC converter 20 by operating the low voltage DC-DC converter 20 to output a voltage that is less than the voltage of the auxiliary battery 40, that is, to output a voltage of a minimum size through which the electric device 50 may operate. Accordingly, various exemplary embodiments of the present invention may be configured to supply electric power lower than a state where the auxiliary battery 40 is connected to the output terminal of the low voltage DC-DC converter 20, and thus power consumption of the electric device 50 may be reduced.

Meanwhile, when an electric connection between the auxiliary battery 40 and the output terminal of the low voltage DC-DC converter 20 is blocked and failure occurs in the low voltage DC-DC converter 20 preventing a normal voltage from being output, the controllers or devices operating by the voltage supplied from the output terminal of the low voltage DC-DC converter 20, that is, a charging voltage of the IG3 power, may be configured to stop operations when the failure occurs. Herein, recording or storing a diagnosing code of failure occurrence is impossible, and as well as, alerting of the failure is also impossible. Accordingly, an exemplary embodiment of the present invention solves the above problem due to the failure occurrence by properly setting a connection relation between the power circuit chip within the low voltage DC-DC converter 20 and the microprocessor.

Figure 2:
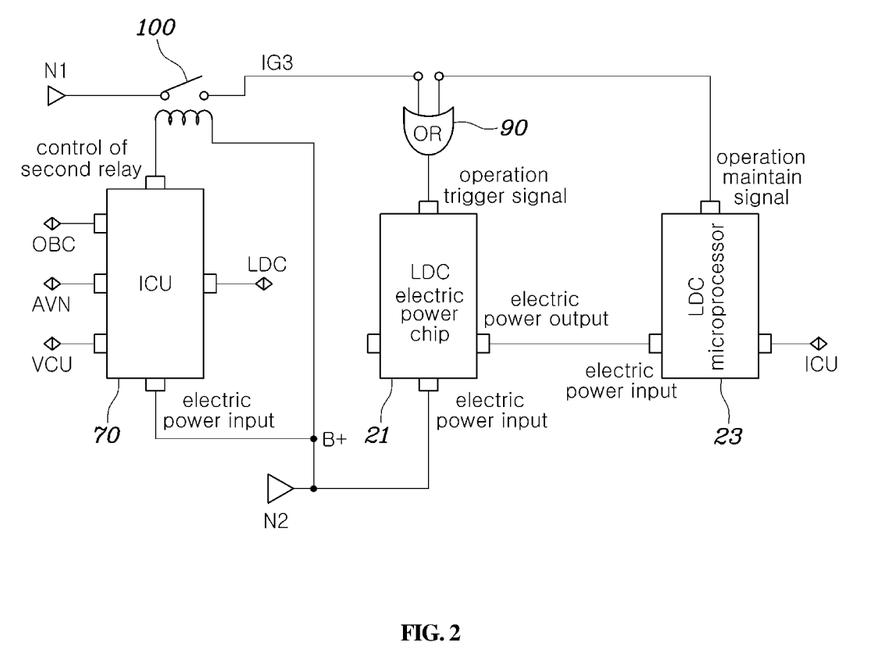
FIG. 2 is a block configuration diagram showing in detail connection relations between various controllers of the system for operating the low voltage DC-DC converter for the vehicle shown in FIG. 1 according to an exemplary embodiment of the present invention.

FIG. 2 is a block configuration diagram showing in detail connection relations between various controllers of the system for operating a low voltage DC-DC converter for a vehicle shown in FIG. 1. Referring to FIG. 2, an exemplary embodiment of the present invention may further include a second relay 100 connected to a node connected to the first terminal of the first relay 60, that is, to the node to which the first relay 60 and the output terminal of the low voltage DC-DC converter 20 are connected, at a first terminal thereof, and connected to the charging electric power line (IG3 power) for supplying a charging voltage at a second terminal thereof. In addition, an exemplary embodiment of the present invention, the low voltage DC-DC converter 20 may include a power circuit chip 21 configured to provide electric power to the low voltage DC-DC converter 20, a microprocessor 23 configured to operate the low voltage DC-DC converter 20 by being supplied with the voltage from the power circuit chip 21, and an OR logic gate 90 configured to generate a trigger signal for determining operation of the power circuit chip 21.

The power circuit chip 21 is an integrated circuit configured to supply electric power to the microprocessor 23 provided in the low voltage DC-DC converter 20 and to other parts, and may be configured to receive constant electric power supplied from the connection node N2 of the first relay 60 and the auxiliary battery 40. The power circuit chip 21 may include a terminal for receiving a trigger signal for determining operation thereof. When a trigger signal of an on state (e.g., high level signal in association with a voltage) is input, the power circuit chip 21 may be configured to start operation, and when a trigger signal of an off state (e.g., ground level signal or low level signal in association with negative signal) is input, the power circuit chip 21 may be configured to stop operation.

The microprocessor 23 may include a processor configured to perform calculation or algorithm for operating the low voltage DC-DC converter 20. Particularly, in connection with the features of the present invention, when electric power is received from the power circuit chip 21, the microprocessor 23 may be configured to output an operation maintain signal. The microprocessor 23 may be configured to continuously output a high level signal in association with the voltage as an operation maintain signal while receiving the electric power from the power circuit chip 21.

When the main battery 10 starts charging using electric power supplied from the external charging equipment, the controller 70 may be configured to turn on the second relay 100 to activate the charging electric power line (IG3 power) to thus supply a charging voltage. Herein, the first relay 60 is in an on state, and thus electrically connects the auxiliary battery 40 and the output terminal of the low voltage DC-DC converter 20.

A high level signal may be input to a first input terminal of the OR logic gate 90 through activation of the charging electric power line (IG3 power), and thus the power circuit chip 21 starts operation. When the power circuit chip 21 operates, the power circuit chip 21 may be configured to supply electric power to the microprocessor 23, and the microprocessor 23 receiving the electric power may be configured to output an operation maintain signal of a high level. The operation maintain signal output from the microprocessor 23 may be provided to another input terminal of the OR logic gate 90.

As described above, when the first relay 60 is turned off as the auxiliary battery 40 is fully charged while the main battery 10 is being charged, the auxiliary battery 40 becomes isolated, and the charging voltage (IG3 power) may be supplied by the output voltage of the low voltage DC-DC converter 20. When failure occurs in the low voltage DC-DC converter 20 preventing a normal output from being provided, the charging voltage (IG3 power) is also prevented from being supplied normally. Conventionally, when the above charging voltage (IG3 power) is not supplied normally (e.g., an error or malfunction occurs), the charging stage may be stopped at the moment, and thus a state occurs where recording a diagnosis code or failure alerting is impossible.

However, according to an exemplary embodiment of the present invention, an operation trigger signal of the power circuit chip may be configured to maintain an on state by the operation maintain signal of the microprocessor 23 provided to the input terminal of the OR logic gate 90, and thus the power circuit chip 21 may be configured to normally and continuously supply electric power to the microprocessor 23, etc. within the low voltage DC-DC converter 20. Accordingly, the microprocessor 23 may be configured to detect a failure, determine and store a failure diagnosis code using a preset algorithm, and alert the failure to the external upper layer controller.

Further, the controller 70 receiving the constant electric power (B+) may be configured to receive a failure occurrence warning output from the microprocessor 23 configured to turn on the first relay 60, that is, in an off state, and recover the charging voltage (IG3 power). Accordingly, the controller 70 may be configured to display the failure through an audio video navigation (AVN) system of the vehicle to allow the driver to detect the failure occurrence. In addition, the controller 70 may be configured to perform appropriate follow-up based on a predetermined process such as stopping normally operation of the OBC 30 or the low voltage DC-DC converter 20, performing initialization for the same, etc.

As described above, when electric power is supplied using the output voltage of the low voltage DC-DC converter 20 while the connection to the auxiliary battery 40 is blocked, even though failure occurs in the low voltage DC-DC converter 20, an exemplary embodiment of the present invention may be configured to determine and store a failure diagnosis code, alert the failure to the external upper layer controller 70, and stably stop the charging the main battery by continuously providing the electric power to the microprocessor 23 within the low voltage DC-DC converter 20.

Figure 3:
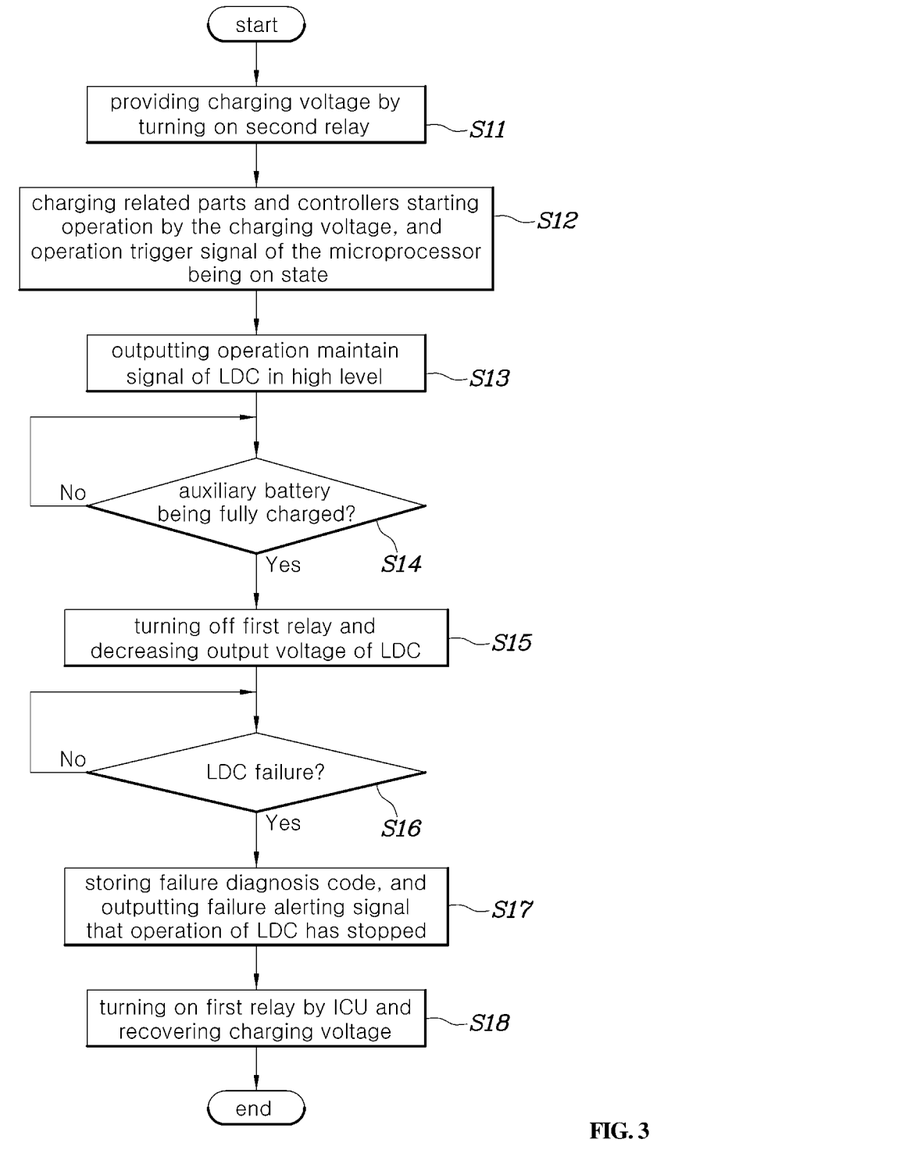
FIG. 3 is a view of a flowchart showing a method of controlling a low voltage DC-DC converter for a vehicle according to an exemplary embodiment of the present invention.
Figure 4:
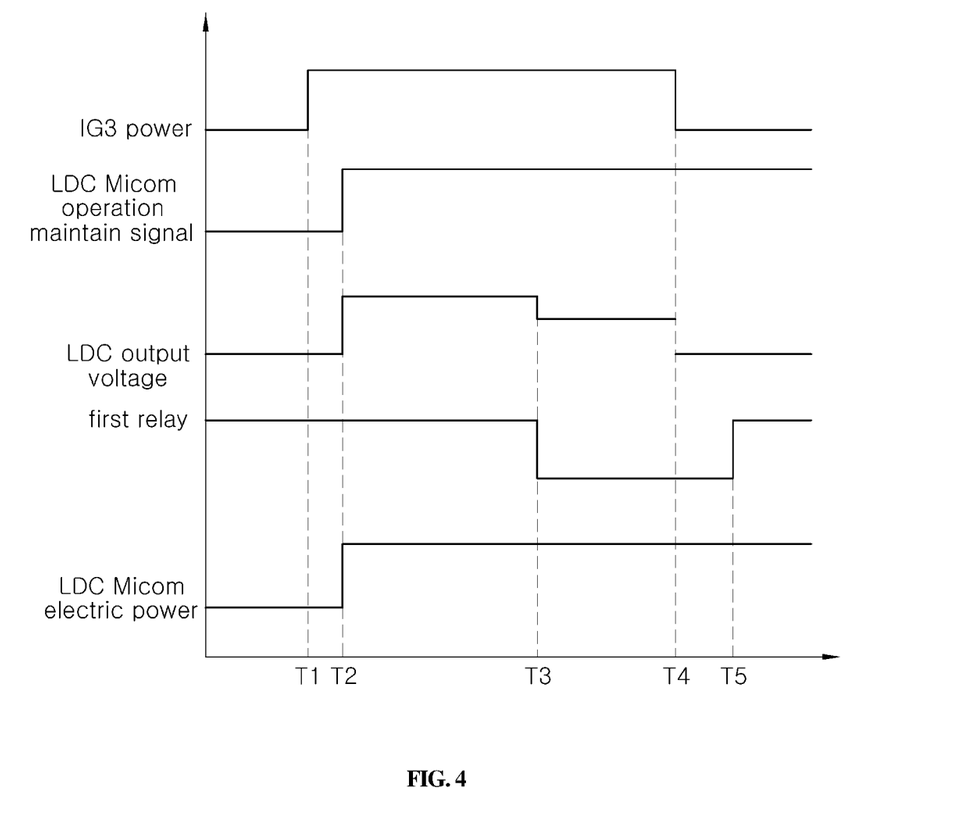
FIG. 4 is a view of a graph showing operation timings of respective configuration elements in the method of controlling the low voltage DC-DC converter for the vehicle of FIG. 3 according to an exemplary embodiment of the present invention.

FIG. 3 is a view of a flowchart showing a method of controlling a low voltage DC-DC converter for a vehicle according to an exemplary embodiment of the present invention, and FIG. 4 is a view of a graph showing operation timings of respective configuration elements in the method of controlling a low voltage DC-DC converter for a vehicle of FIG. 3. Referring to FIGS. 3 and 4, the method of controlling the low voltage DC-DC converter for the vehicle according to an exemplary embodiment of the present invention may start from S11 of supplying, by the controller 70, a charging voltage (IG3 power) by turning on the second relay 100 when the main battery starts charging by being supplied with electric power from external charging equipment through timer setting or user input. In particular, S11 corresponds to a timing "T1" of FIG. 4.

Subsequently, in S12, charging related parts and controllers operating by the charging voltage (IG3 power) start operation, and the charging voltage (IG3 power) may be supplied to a first input terminal of the OR logic gate 90, and thus internal electric power may be supplied by the power circuit chip 21 of the low voltage DC-DC converter 20. Subsequently, in S13, the microprocessor 23 may be configured to receive electric power from the power circuit chip 21, and the microprocessor 23 may be configured to output an operation maintain signal of a high level. Accordingly, the microprocessor 23 may be configured to operate the low voltage DC-DC converter 20 based on a command of the controllers 70 and 80, and the auxiliary battery 40 may be configured to begin charging. Of course, in S13, the OBC 30 starts operation and the main battery 10 also starts charging. In particular, S13 corresponds to a timing "T2" of FIG. 4.

Subsequently, in S14, the controller 70 may be configured to monitor a state of charge (SOC) of the auxiliary battery 40, and in S15, when the auxiliary battery 40 becomes charged to a preset reference value, the controller 80 may be configured to turn the first relay 60 off and decrease an output voltage command of the low voltage DC-DC converter 20 to reduce the output voltage of the low voltage DC-DC converter 20 and thus, the low voltage DC-DC converter 20 may be configured to output a minimum voltage capable of operating the electric device 50. Notably, S15 corresponds to a timing "T3" of FIG. 4.

Subsequently, in S16, when failure occurs in the low voltage DC-DC converter 20 before the main battery 10 is fully charged and while the first relay 60 is turned off thus preventing the voltage DC-DC converter 20 from outputting the voltage normally, as described above, an operation trigger of the power circuit chip may be configured to maintain an on state by the operation maintain signal of the microprocessor 23 which is provided to the first input terminal of the OR logic gate 90, and thus the power circuit chip 21 may be configured to normally and continuously supply the electric power to the microprocessor 23, etc. within the low voltage DC-DC converter 20. Accordingly, in S17, the microprocessor 23 may be configured to detect the failure, determine and store a failure diagnosis code using a preset algorithm, and output an alert that the operation of the low voltage DC-DC converter has stopped to the external upper layer controller 70. Notably, S17 may be performed from a timing "T4" of FIG. 4 at which the failure of the low voltage DC-DC converter 20 has occurred.

Subsequently, in S18, the controller 70 receiving the constant electric power (B+ power) may be configured to receive a failure occurrence warning provided from the microprocessor 23, turn on the first relay 60 that is in an off state, and recover the charging voltage (IG3 power). Accordingly, the controller 70 may be configured to display the failure occurrence through an audio video navigation (AVN) system of the vehicle to allow the driver to detect the failure occurrence. In addition, the controller 70 may be configured to perform appropriate follow-up based on a predetermined process such as stopping normal operation of the OBC 30 or the low voltage DC-DC converter 20, performing initialization for the same, etc. In particular, S18 may start from a timing "T5" of FIG. 4 after the failure of the low voltage DC-DC converter 20 has occurred.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A system for controlling a low voltage direct current-direct current (DC-DC) converter for a vehicle, comprising:
   the low voltage DC-DC converter configured to convert a voltage of a main battery into a low voltage and output the low voltage;
   an electric device connected to an output terminal of the low voltage DC-DC converter;
   a first relay connected to the output terminal of the low voltage DC-DC converter at a first terminal thereof;
   an auxiliary battery connected to a second terminal of the first relay;
   a controller configured to turn off the first relay and operate the low voltage DC-DC converter to output a minimum voltage capable of operating the electric device when the auxiliary battery is charged to a preset reference value or more while the main battery is being charged; and
   a second relay connected to the first terminal of the first relay at a first terminal thereof, and connected to a charging electric power line for providing a charging voltage at a second terminal thereof,
   wherein when the main battery starts charging by receiving charging electric power from external charging equipment, the controller is configured to supply the charging voltage when the auxiliary battery is being charged from the first terminal of the first relay, and
   wherein the controller is configured to turn on the second relay to supply the charging voltage when the main battery starts charging.

2. The system of claim 1, wherein the low voltage DC-DC converter includes:
   a power circuit chip configured to supply electric power to the low voltage DC-DC converter; and
   a microprocessor configured to operate the low voltage DC-DC converter by being supplied with a voltage from the power circuit chip,
   wherein the power circuit chip is supplied with a constant voltage from the auxiliary battery by being connected to the second terminal of the first relay, and configured to provide or block the voltage to or from the microprocessor by receiving a trigger signal.

3. The system of claim 2, wherein the microprocessor is configured to output an operation maintain signal when receiving the voltage, and the low voltage DC-DC converter further includes an OR logic gate configured to receive the charging voltage and the operation maintain signal as an input, and provide the trigger signal to the power circuit chip as an output.

4. The system of claim 3, wherein the microprocessor is configured to store a failure diagnosis code and transfer a failure alerting signal to the controller when failure occurs in the low voltage DC-DC converter where the output voltage of the low voltage DC-DC converter is generated with an error.

5. The system of claim 4, wherein the controller is configured to turn on the first relay after being provided with the failure alerting signal.

6. A method of controlling a low voltage DC-DC converter for a vehicle, wherein the method is performed using: the low voltage DC-DC converter converting a voltage of a main battery into a low voltage and outputting the low voltage; an electric device connected to an output terminal of the low voltage DC-DC converter; a first relay connected to the output terminal of the low voltage DC-DC converter at a first terminal thereof; and an auxiliary battery connected to a second terminal of the first relay, the method comprising:
   monitoring, by a processor, a state of charge (SOC) of the auxiliary battery when the main battery starts charging by being supplied with charging electric power from external charging equipment; and
   prior to monitoring the SOC of the auxiliary battery, when the main battery starts charging, providing a charging voltage for supplying electric power to a controller operating when the auxiliary battery is being charged from the first terminal of the first relay,
   wherein in providing the charging voltage, the charging voltage is supplied by turning on a second relay that is connected to the first terminal of the first relay at a first terminal thereof, and connected to a charging electric power line for supplying the charging voltage at a second terminal thereof, and
   when the auxiliary battery is charged to a preset reference value or more, turning off, by the processor, the first relay, and operating the low voltage DC-DC converter to output a minimum voltage capable of operating the electric device.

7. The method of claim 6, further comprising:
   after operating the low voltage DC-DC converter, when failure occurs in the low voltage DC-DC converter where the output voltage of the low voltage DC-DC converter is generated with an error, storing a failure diagnosis code, and generating a failure alerting signal.

8. The method of claim 7, further comprising:
   after generating the failure alerting signal, turning on the first relay.

9. The method of claim 6, wherein the low voltage DC-DC converter includes: a power circuit chip configured to supply electric power to the low voltage DC-DC converter, wherein whether to supply the electric power is determined by a trigger signal; a microprocessor configured to operate the low voltage DC-DC converter by being supplied with a voltage from the power circuit chip, and outputting an operation maintain signal when receiving the voltage; and an OR logic gate configured to receive the charging voltage and the operation maintain signal as an input, and outputting the trigger signal as an output.

10. The method of claim 9, wherein prior to monitoring the SOC of the auxiliary battery, the method further includes:
   generating, by the OR logic gate, a trigger signal of an on state by receiving the voltage in a first input terminal of the OR logic gate to provide the voltage by the power circuit chip; and
   outputting, by the microprocessor, the operation maintain signal by receiving the voltage from the power circuit chip, and providing the voltage to a second input terminal of the OR logic gate.

* * * * *